United States Patent
Jiang et al.

(10) Patent No.: US 11,448,173 B2
(45) Date of Patent: Sep. 20, 2022

(54) RETURN TUBE OF A FUEL FILTER ASSEMBLY OF A FUEL SYSTEM

(71) Applicant: Cummins Filtration IP, Inc., Columbus, IN (US)

(72) Inventors: Zemin Jiang, Cookeville, TN (US); Ted S. Loftis, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 117 days.

(21) Appl. No.: 16/646,692

(22) PCT Filed: Sep. 25, 2018

(86) PCT No.: PCT/US2018/052537
§ 371 (c)(1),
(2) Date: Mar. 12, 2020

(87) PCT Pub. No.: WO2019/067387
PCT Pub. Date: Apr. 4, 2019

(65) Prior Publication Data
US 2020/0277921 A1 Sep. 3, 2020

Related U.S. Application Data

(60) Provisional application No. 62/563,270, filed on Sep. 26, 2017.

(51) Int. Cl.
*F02M 37/34* (2019.01)
*B01D 29/15* (2006.01)
(Continued)

(52) U.S. Cl.
CPC ............. *F02M 37/34* (2019.01); *B01D 29/15* (2013.01); *B01D 35/005* (2013.01); *B01D 36/006* (2013.01); *F02M 37/24* (2019.01)

(58) Field of Classification Search
CPC ........ F02M 37/34; F02M 37/24; F02M 37/28; B01D 29/15; B01D 35/005; B01D 36/006; B01D 2201/291; B01D 36/003
(Continued)

(56) References Cited

U.S. PATENT DOCUMENTS 4,253,954 A * 3/1981 Midkiff ................ B01D 36/003
210/DIG. 5
5,149,433 A * 9/1992 Lien ....................... F02M 37/24
210/641
(Continued)

FOREIGN PATENT DOCUMENTS

| CN | 1715636 | 1/2006 |
|----|---------|--------|
| CN | 107002603 | 8/2017 |

(Continued)

OTHER PUBLICATIONS

International Search Report and Written Opinion issued for PCT/US 2019/051239, dated Dec. 5, 2019, 13 pages.
(Continued)

*Primary Examiner* — Madeline Gonzalez
(74) *Attorney, Agent, or Firm* — Foley & Lardner LLP

(57) ABSTRACT

A fuel filter assembly for filtering a fuel-liquid mixture comprises a filter cartridge and a return tube. The filter cartridge comprises a filter media and a housing. The filter media defines an open central region therein. The housing contains the filter media. The return tube extends into the central region of the filter media. The return tube collects and drains liquid from a bottom inner region of the filter media.

19 Claims, 3 Drawing Sheets

(51) Int. Cl.
*B01D 36/00* (2006.01)
*B01D 35/00* (2006.01)
*F02M 37/24* (2019.01)

(58) Field of Classification Search
USPC ........ 210/416.4, 167.01, 167.02, 194, 195.1, 210/197, 248, 438, 440, 450, 444, DIG. 5, 210/457, 493.2
See application file for complete search history.

(56) References Cited

U.S. PATENT DOCUMENTS

| | | | |
|---|---|---|---|
| 5,462,658 A * | 10/1995 | Sem | B01D 36/003 210/172.1 |
| 5,494,410 A | 2/1996 | Maier-Laxhuber et al. | |
| 5,788,859 A * | 8/1998 | Biere | B01D 17/10 210/312 |
| 5,951,862 A | 9/1999 | Bradford | |
| 6,270,659 B1 * | 8/2001 | Bagci | B01D 36/001 210/111 |
| 7,141,163 B2 | 11/2006 | Girondi | |
| 7,731,845 B2 | 6/2010 | Lampert et al. | |
| 8,231,779 B2 | 7/2012 | Jokschas et al. | |
| 8,343,344 B2 | 1/2013 | Reyinger et al. | |
| 8,540,873 B2 | 9/2013 | Lika | |
| 8,673,138 B2 | 3/2014 | Braunheim | |
| 2004/0221647 A1 | 11/2004 | Sabatino | |
| 2006/0086649 A1 | 4/2006 | Wieczorek et al. | |
| 2007/0039865 A1 | 2/2007 | Jiang et al. | |
| 2008/0245719 A1 | 10/2008 | Beard et al. | |
| 2009/0113880 A1 | 5/2009 | Clausen | |
| 2010/0219116 A1 | 9/2010 | Milum | |
| 2010/0294707 A1 | 11/2010 | Abdalla et al. | |
| 2011/0088800 A1 | 4/2011 | Core | |
| 2011/0147290 A1 * | 6/2011 | Braunheim | B01D 36/008 210/172.1 |
| 2015/0182892 A1 | 7/2015 | Schweitzer | |
| 2017/0021295 A1 | 1/2017 | Willems et al. | |
| 2018/0291911 A1 | 10/2018 | Ward et al. | |
| 2020/0086241 A1 | 3/2020 | Downs | |

FOREIGN PATENT DOCUMENTS

| | | |
|---|---|---|
| JP | 2004-257314 | 9/2004 |
| WO | WO-2008/134494 | 11/2008 |
| WO | WO-2017/221226 | 12/2017 |
| WO | WO-2018/067437 | 4/2018 |

OTHER PUBLICATIONS

International Search Report and Written Opinion issued for PCT/US2018/052537, dated Nov. 15, 2018, 8 pages.
First Office Action issued for Chinese Patent Application 2018800585806 dated May 21, 2021, 10 pages.

* cited by examiner

RETURN TUBE OF A FUEL FILTER ASSEMBLY OF A FUEL SYSTEM

CROSS-REFERENCE TO RELATED PATENT APPLICATIONS

This application is a national stage of PCT Application No. PCT/US2018/052537, filed Sep. 25, 2018 which claims priority to and the benefit of U.S. Provisional Patent Application No. 62/563,270, filed Sep. 26, 2017. The contents of these applications are incorporated herein by reference in their entirety and for all purposes.

FIELD

The present invention relates generally to water removal within a fuel filter assembly of a fuel system.

BACKGROUND

In conventional fuel systems with a filter water separator (FWS), water is coalesced into and accumulates within a center tube of a conventional fuel filter assembly of the fuel system, in particular when the fuel filter assembly is old in service or has poor quality fuel. When the water level rises to a certain level within the conventional fuel filter assembly, the water is carried by the fuel into the rest of the fuel system (e.g., into the fuel injectors), which causes damage to the fuel system and/or the engine system.

Accordingly, such conventional fuel filter assemblies includes a drain valve and a water in fuel (WIF) sensor on the high pressure side of the conventional fuel filter assembly in order to drain the water. However, the drain valve and the WIF system introduce structural weakness (and are structural weak points themselves) within the fuel filter assembly, and many users choose not to drain water at the high pressure side of the conventional fuel filter assembly. Furthermore, the conventional fuel filter assembly requires the water to be manually drained. However, in most cases, it is difficult to reach the pressure side of the conventional fuel filter assembly in order to drain the water. Even further, water is only drained from the sump in the conventional fuel filter assembly. Accordingly, water inside the conventional fuel filter assembly can still be pushed through the rest of the fuel system with the fuel, which can cause damage to the fuel system.

Some conventional fuel systems have a FWS that includes a drain tube that drains water from the water sump of the FWS. However, this system only drains water from outside of the filter cartridge, even if the drain tube extends down to the water sump through the filter cartridge. Accordingly, water inside of the center tube of the filter cartridge can still accumulate.

SUMMARY

Various embodiments provide for a fuel filter assembly for filtering a fuel-liquid mixture that comprises a filter cartridge and a return tube. The filter cartridge comprises a filter media and a housing. The filter media defines an open central region therein. The housing contains the filter media. The return tube extends into the central region of the filter media. The return tube collects and drains immiscible liquid (such as water) from a bottom inner region of the filter media.

Various other embodiments provide for a fuel system that comprises a fuel tank configured to store a fuel-liquid mixture (e.g., a fuel-water mixture), a fuel filter assembly for filtering the fuel-liquid mixture, and a liquid drain line. The fuel filter assembly is fluidly connected to the fuel tank and comprises a filter cartridge and a return tube. The filter cartridge comprises a filter media and a housing. The filter media defines an open central region therein. The housing contains the filter media. The return tube extends into the central region of the filter media and collects and drains liquid from a bottom inner region of the filter media. The liquid drain line is coupled to the return tube.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a return tube for a fuel filter assembly that attaches to a water drain line (or more generally a liquid drain line) within a fuel system. The return tube is configured to remove water (or other immiscible liquid) from inside the fuel filter assembly, in particular from the inside the center tube of a fuel filter assembly, for example a last-stage filter assembly (which is the last location where water can accumulate or be stored before the fuel is utilized within the fuel system (e.g., in the fuel injectors)). The return tube functions as a "gate" in order to ensure that no water enters into the high pressure (HP) pumps and the fuel injectors. It should be understood that references to water in the context of liquid separation herein are applicable to other immiscible liquids as well.

By providing the return tube within the fuel filter assembly, the fuel filter assembly no longer requires a drain valve and WIF sensor built into the high pressure side of the fuel filter assembly, and the fuel filter assembly does not need to be manually drained. Furthermore, with the return tube, the design of the fuel system (in particular the fuel filter assembly) is more simple than conventional fuel systems since the fuel system does not require as many seals throughout the fuel filter assembly, thereby resulting in a lower cost system. For example, the fuel system does not require an additional seal at the bottom end plate.

Fuel System

Figure 1:
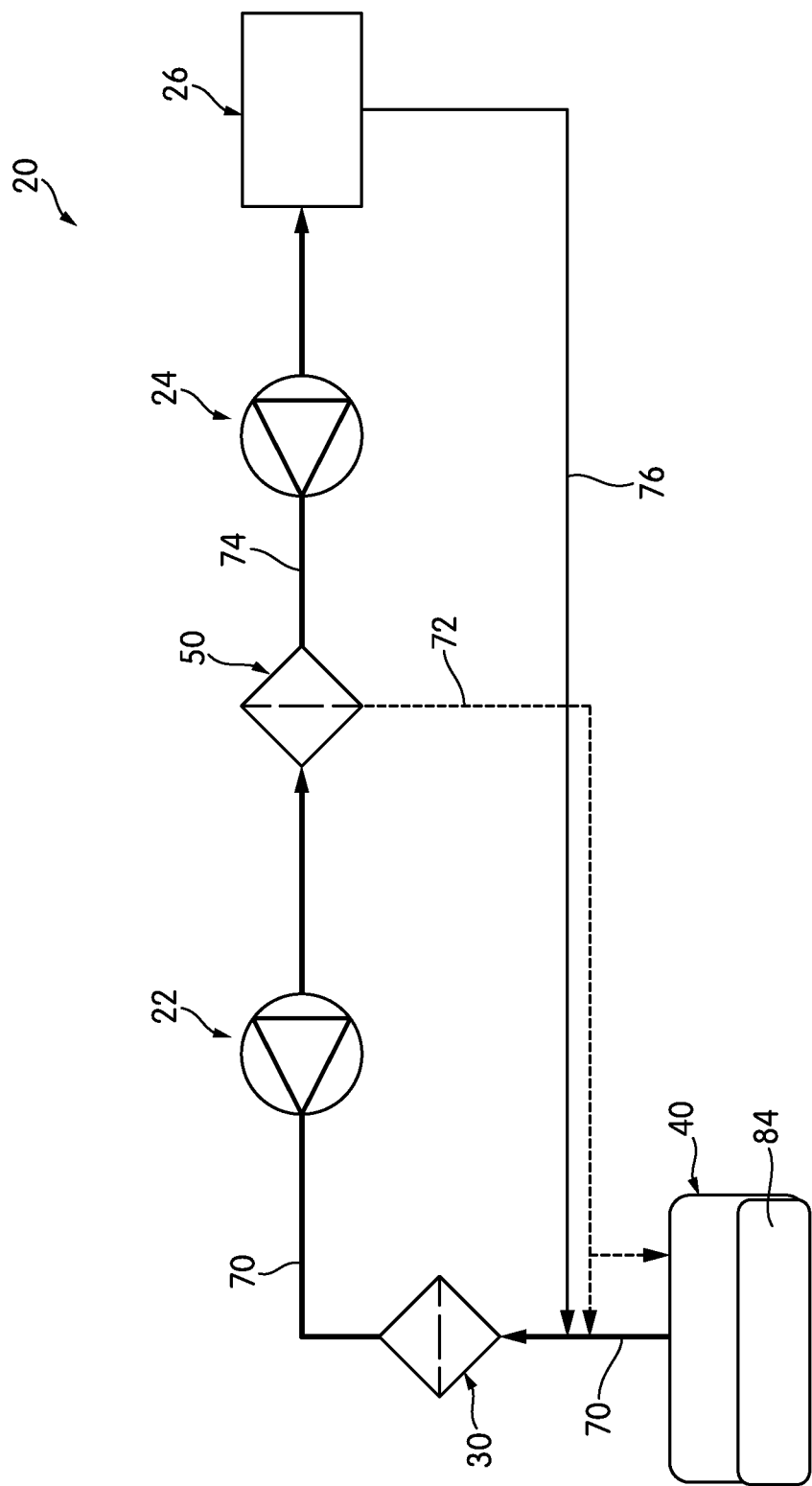
FIG. 1 is a schematic view of the fuel system according to one embodiment.

FIG. 1 shows a schematic representation of a fuel system 20 according to one embodiment. The fuel system 20 can be used within a variety of different engine applications, such as all sizes of diesel engines.

As shown in FIG. 1, the fuel system 20 comprises a fuel tank 40, a FWS 30, a fuel pump 22, a fuel filter assembly 50, a HP pump 24, and fuel injectors 26. The fuel tank 40 stores a fuel-liquid mixture, e.g., a fuel-water mixture. The fuel tank 40 is fluidly connected to the FWS 30, the fuel pump 22, and the fuel filter assembly 50 such that a fuel-liquid mixture flows from the fuel tank 40 to the FWS 30, to the fuel pump 22, and then to the fuel filter assembly 50. The FWS 30 is configured to separate immiscible liquid (e.g., water) from the fuel-liquid mixture. It should be understood that all references to "liquid" or "immiscible liquid" herein are intended to encompass water. However, "liquid" should not be interpreted to solely cover a liquid that is one hundred percent water. Similarly, references to a "fuel-liquid mixture" are intended to encompass—but not solely cover—a fuel-water mixture or a mixture of fuel and another immiscible liquid. The fuel pump 22 is configured to pump the fuel-liquid mixture from the fuel tank 40 to the fuel filter assembly 50. The fuel filter assembly 50, which is fluidly connected to the fuel tank 40, is configured to filter the fuel-liquid mixture and direct the fuel to the HP pump 24 (and fuel injectors 26) and water back to the front end of the fuel system 20, as described further herein. The HP pump 24 is configured to pump the fuel from the fuel filter assembly 50 to the fuel injectors 26. The fuel injectors 26 are configured to inject the fuel into a device (e.g., an engine) for use and are fluidly connected to the fuel filter assembly 50 such that fuel flows from the fuel tank 40, to the FWS 30, to the fuel pump 22, to the HP pump 24, and then to the fuel injectors 26. The fuel system 20 further comprises a supply line 70, a water drain line 72, a fuel supply line 74, and a fuel return line 76 to fluidly connect the various components of the fuel system 20.

In order to operate the fuel system 20, a fuel-liquid mixture is moved through a supply line 70 from the fuel tank 40, to the FWS 30, to the fuel pump 22, and then to the fuel filter assembly 50. The supply line 70 fluidly connects the fuel tank 40 to the fuel filter assembly 50 in order to direct the fuel-liquid mixture from the fuel tank 40 to the fuel filter assembly 50. Specifically, the supply line 70 fluidly connects the fuel tank 40 to the FWS 30, the FWS 30 to the fuel pump 22, and the fuel pump 22 to the fuel filter assembly 50. The fuel-liquid mixture in the supply line 70 may comprise both fuel and water.

In the fuel filter assembly 50, the fuel-liquid mixture is filtered (as described further herein). The water 84 from the fuel-liquid mixture from the fuel filter assembly 50 is drained from the fuel filter assembly 50 to either the fuel tank 40 or the FWS 30 (or directly or indirectly to the supply line 70) through a water drain line 72 and/or to the fuel return line 76. Accordingly, the water drain line 72 fluidly connects the fuel filter assembly 50 to the fuel tank 40, the FWS 30 (or the supply line 70), or the fuel return line 76.

The fuel from the fuel-liquid mixture from the fuel filter assembly 50 is moved from the fuel filter assembly 50 to the HP pump 24 and then to the fuel injectors 26 through a fuel supply line 74. Accordingly, the fuel supply line 74 fluidly connects the fuel filter assembly 50 to the HP pump 24 and the HP pump 24 to the fuel injectors 26.

After the fuel flows through the fuel injectors 26, the fuel is returned from the fuel injectors 26 back to the FWS 30 (or the supply line 70) through an engine fuel return line 76. The fuel return line 76 returns fuel to the fuel tank 40, the supply line 70, and/or to the fuel supply line 74. The fuel injectors 26 are fluidly connected to the fuel tank 40 or the supply line 70 through the fuel return line 76 such that fuel flows from the fuel injectors 26 into the fuel tank 40 or the supply line 70 through the fuel return line 76. Accordingly, the fuel return line 76 fluidly connects the fuel injectors 26 to the FWS 30. Depending on the configuration of the fuel system 20, the water drain line 72 and the fuel return line 76 may operate in parallel with each other, each draining liquid to the supply line 70 and/or the fuel tank 40.

Fuel Filter Assembly

The fuel filter assembly 50 is configured to filter the fuel-liquid mixture received from the fuel tank 40. The fuel filter assembly 50 may comprise a last-stage or final fuel filter assembly before the fuel is directed to the HP pump 24 and the fuel injectors 26. The fuel filter assembly 50 may alternatively comprise an interim-stage fuel filter assembly, i.e., where there is a last-stage fuel filter assembly positioned downstream thereof.

Figure 2:
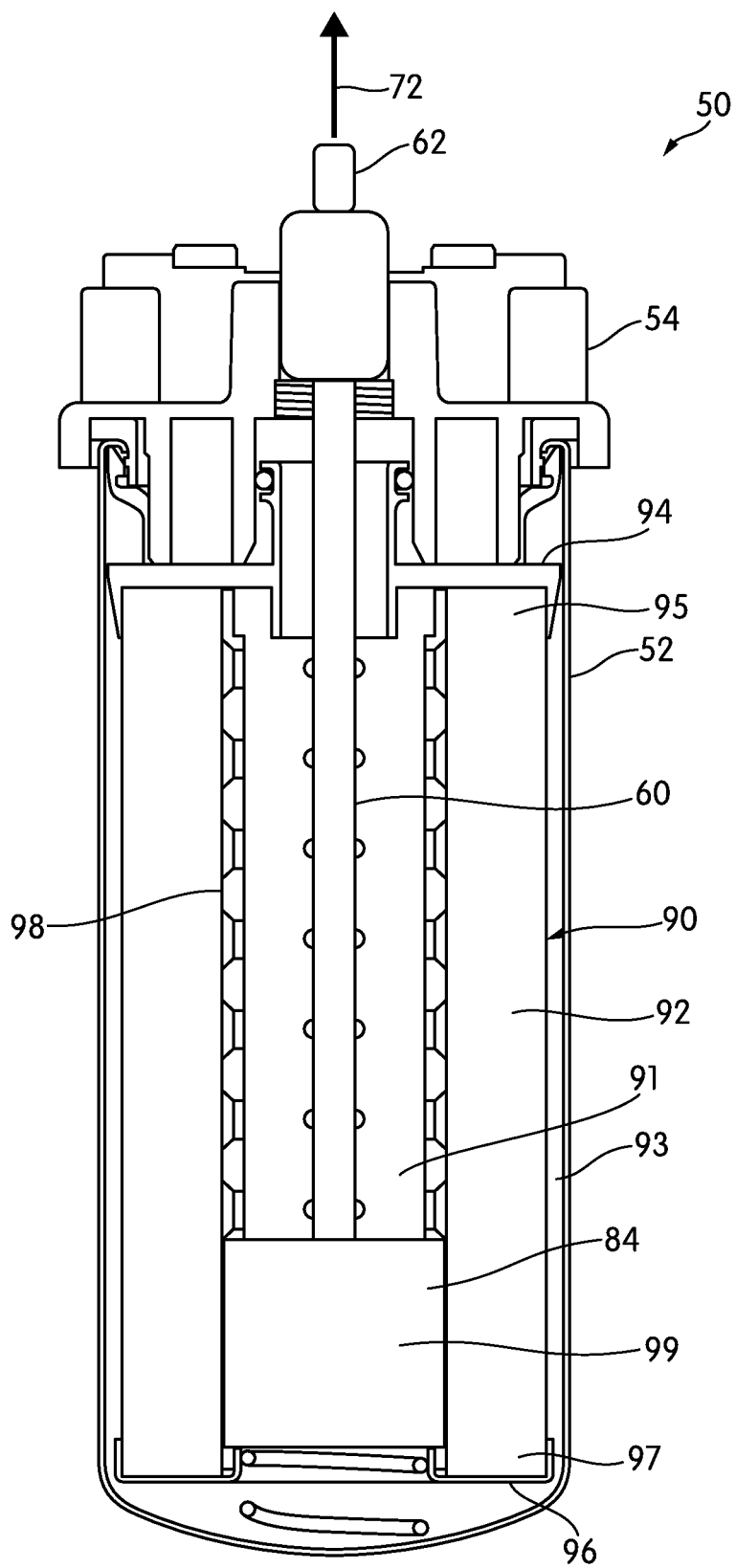
FIG. 2 is a cross-sectional view of a fuel filter assembly of the fuel system of FIG. 1 according to one embodiment.
Figure 3:
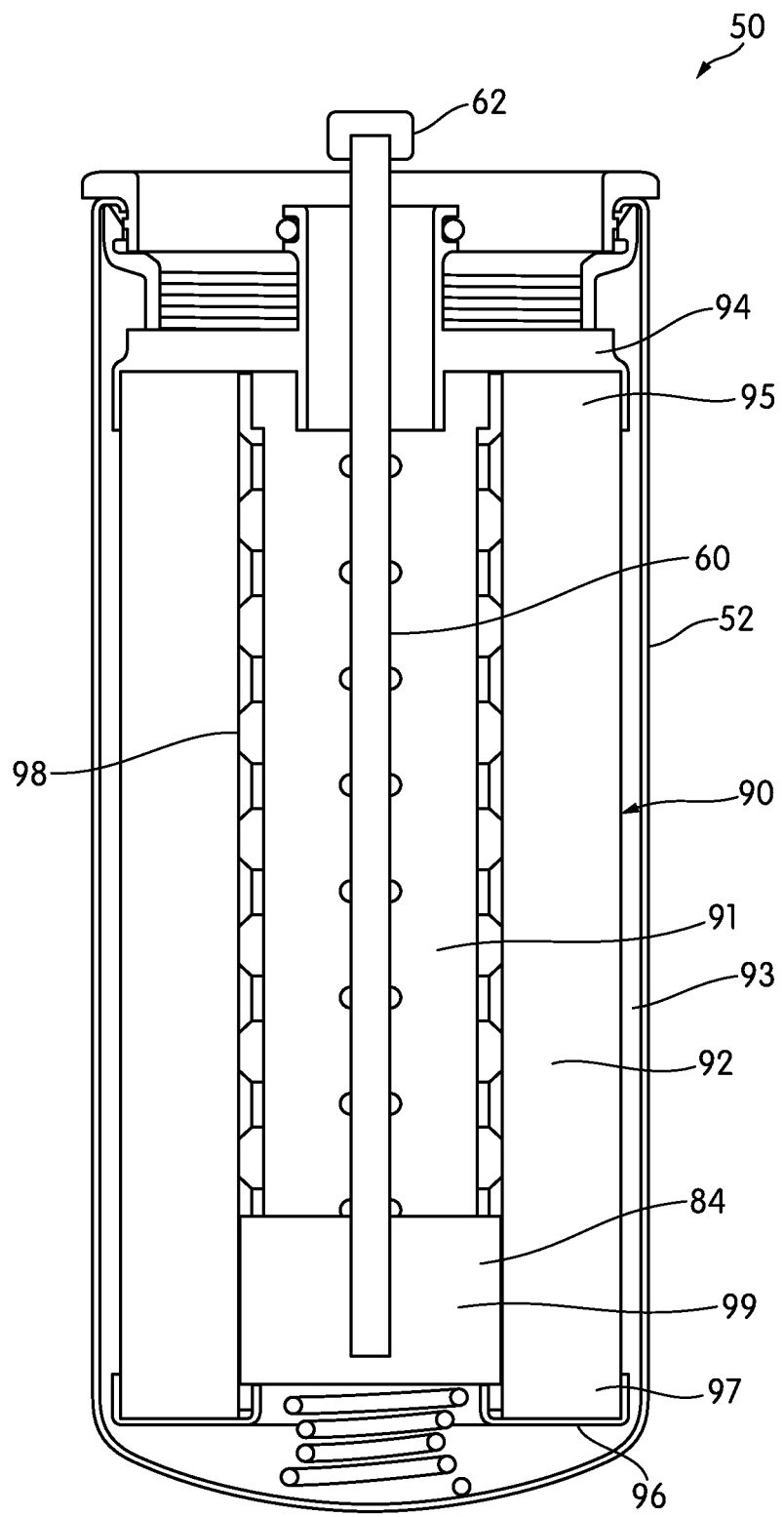
FIG. 3 is a cross-sectional view of another fuel filter assembly of the fuel system of FIG. 1 according to another embodiment.

As shown in FIGS. 2-3, the fuel filter assembly 50 comprises a filter cartridge 90 and a return tube 60. The filter cartridge 90 comprises a filter element, a center tube 98, and a housing 52. The filter element comprises a filter media 92 for filtering the fuel-liquid mixture, a bottom endplate 96, and a top endplate 94. The housing 52 houses or contains the filter element. The filter media 92 has a generally cylindrical shape with (or that defines) an open inner or central space or region 91 of the filter media 92 defined therein. An outer space or region 93 of the filter media 92 is defined by the outer surface of the filter media 92 and the inner surface of the housing 52. The central region 91 and the outer region 93 are on opposite sides of the filter media 92. According to one embodiment, the central region 91 is on the clean, filtered side of the filter media 92 and the outer region 93 is on the dirty, unfiltered side of the filter media 92. The filter media 92 further comprises a bottom region 97 and a top region 95 (with the filter media 92 extending between the bottom region 97 and the top region 95). The filter media 92 defines a bottom inner region 99 along the bottom region 97 of the filter media 92, as described further herein. As described further herein, water 84 (that is coalesced from the fuel-liquid mixture) accumulates within the bottom inner region 99 (and therefore within the bottom region 97). Accordingly, the top region 95 of the filter media 92 is on an opposite end of the filter media 92 as (and above) the water 84.

The bottom endplate 96 is positioned along the bottom region 97 of the filter media 92, and the top endplate 94 is positioned along the top region 95 of the filter media 92. The center tube 98 is positioned in the central region 91 of the filter media 92 and extends between the bottom region 97 and the top region 95 of the filter media 92. The center tube 98 extends along an inner perimeter or circumference of the filter media 92 and circumferentially surrounds the return tube 60 (as described further herein). The engine assembly (that the fuel filter assembly 50 can be used with) comprises a filter head. The filter cartridge 90 of the fuel filter assembly 50 attaches to (e.g., spins onto) the filter head 54 such that the filter head 54 is positioned on top of the top endplate 94 of the filter cartridge 90.

In order to filter the fuel-liquid mixture, the fuel filter assembly 50 may use a variety of different techniques. According to one embodiment, the fuel filter assembly 50 coalesces the fuel-liquid mixture inside the fuel filter assembly 50. The coalesced water 84 accumulates within the open bottom inner or central space or region 99 defined by the filter media 92 and the center tube 98. The fuel filter assembly 50 directs or drains separated, coalesced water 84 back to the front end of the fuel system 20 through the return tube 60 and the water drain line 72 (as described further herein) and directs fuel into the HP pump 24 and the fuel injectors 26 in order to be used.

Return Tube

In order to drain or remove the water 84 from the inside of the fuel filter assembly 50 into the water drain line 72, the fuel filter assembly 50 comprises a straw or return tube 60. The return tube 60 is fluidly coupled to the water drain line 72. With the water drain line 72, the return tube 60 creates a return loop to automatically and continually drain water 84 from inside the fuel filter assembly 50 (i.e., from the bottom inner region 99 and the central region 91 of the filter media 92) to an area outside of the fuel filter assembly 50. Accordingly, water 84 is prevented from substantially accumulating within the central region 91 of the filter media 92 (and the inner or central region of the center tube 98 of the filter cartridge 90) and is therefore prevented from entering into the last stages (i.e., the HP pump 24 or the fuel injectors 26) of the fuel system 20, which keeps the last stages of the fuel system 20 dry from water 84 and protects the fuel system 20 from water damage. Further, the return tube 60 eliminates the need for any manual work, drain valves, or WIF sensor in order to drain water from the fuel filter assembly 50. According to one embodiment, the water 84 within the filter cartridge 90 is drained completely and solely through the return tube 60, and therefore the filter cartridge 90 does not include any drain valve or WIF sensor and does not need to be manually drained.

The return tube 60 is configured to automatically and continuously remove or drain water 84 (and optionally fuel) from the inside of the center tube 98 of the filter cartridge 90 (and from the bottom inner region 99 of the filter media 92) and move or direct the water into the water drain line 72. Accordingly, the return tube 60 extends into the central region 91 of the filter media 92. For example, the return tube 60 is positioned within or inside the central region 91 of the filter media 92 and within the central region of the center tube 98 of the filter cartridge 90 in order to drain water from the inside the center tube 98 and the filter media 92, which is the last location that water can be stored or can accumulate within before entering into the last stages of the fuel system 20 in which the fuel is utilized, such as the fuel injectors 26. Because the return tube 60 is positioned within the central region 91 of the filter media 92, the return tube 60 is positioned on the clean, filtered side of the filter media 92 of the filter cartridge 90, which prevents the return tube 60 from ever becoming plugged or clogged. The return tube 60 may be positioned within the high pressure side of the fuel filter assembly 50.

The return tube 60 extends through and along the central region of the center tube 98 (and the central region 91 of the filter media 92). In order to reach the accumulated water 84 that accumulates within the bottom inner region 99 (and therefore the bottom region 97) of the filter media 92, the return tube 60 extends from the bottom region 97 (i.e., near the bottom endplate 96) of the filter media 92 to the top region 95 of the filter media 92, through the top endplate 94 of the filter cartridge 90, and optionally through the filter head 54. Accordingly, the top endplate 94 may optionally be open with a through-hole, and the bottom endplate 96 may optionally be closed off, without a through-hole, according to one embodiment.

According to one embodiment, the top end of the return tube 60 (e.g., the end of the return tube 60 that is opposite the end of the return tube 60 that is closest to the bottom endplate 96 of the filter cartridge 90) is sealed and fluidly connected or attached directly to the water drain line 72 or the filter head 54. Accordingly, a seal member 62 is positioned between and sealably connects the top end of the return tube 60 to the water drain line 72 and/or the filter head 54. According to another embodiment, the top end of the return tube 60 is built into or connected and sealed to the return flow port of the filter head 54, and the seal member 62 sealably attaches the return tube 60 to a portion of the fuel filter assembly 50, such as the housing 52. The flow port of the filter head 54 is then fluidly attached to the water drain line 72.

The bottom end of the return tube 60 (e.g., the end of the return tube 60 that is closest to the bottom endplate 96 of the filter cartridge 90 when installed) is positioned within the bottom inner region 99 of the filter media 92 (i.e., toward the bottom region 97 of the filter media 92 and in the central region 91 of the filter media 92, where the water 84 accumulates within the fuel filter assembly 50). Accordingly, the bottom end of the return tube 60 may be submerged in water 84 within the fuel filter assembly 50 that is about to be drained into the water drain line 72. The bottom end of the return tube 60 is substantially open in order to allow water 84 to flow into the return tube 60.

The inner diameter of the return tube 60 is relatively small in order to provide a relatively limited or small flow path, which limits the return flow rate of the water 84 through both the return tube 60 and the water drain line 72. Accordingly, a low quantity amount of water 84 (and optionally fuel) is constantly and continuously flowing or being pushed out of the fuel filter assembly 50 through the return tube 60 and into the water drain line 72 at a restricted flow rate.

Water Drainage

The return tube 60 collects and drains water from the bottom inner region 99 of the filter media 92 to an area outside of the fuel filter assembly 50. More specifically, as the fuel-liquid mixture enters into the fuel filter assembly 50 and as the fuel-liquid mixture is filtered by the filter cartridge 90 of the fuel filter assembly 50, the water 84 sinks to the bottom inner region 99 of the filter media 92 within the fuel filter assembly 50, which is where the bottom end of the return tube 60 is positioned. As the water 84 accumulates in the bottom inner region 99 (and within the bottom region 97) of the filter media 92, pressure within the fuel filter assembly 50 constantly and continually and slowly forces the water 84 (and optionally fuel) at the bottom inner region 99 of the filter media 92 to flow up and through the return tube 60 (i.e., the water 84 flows upward from the bottom inner region 99 through the bottom end of the return tube 60, from the bottom end to the top end, and through the top end of the return tube 60), through the filter head 54, and then into the water drain line 72 at a restricted fuel flow rate, which continually keeps the fuel system 20 (in particular the HP pump 24 and the fuel injectors 26) dry. Accordingly, the top end of the return tube 60 is positioned above the water 84, and the bottom end of the return tube 60 is positioned within the water 84.

As shown in FIG. 1, from the return tube 60, the water drain line 72 can lead, direct, or return the flow of water 84 to a variety of different areas outside of the fuel filter assembly 50. For example, according to one embodiment, the water drain line 72 can direct the flow of water 84 from the return tube 60 to an area outside of the fuel system 20 (e.g., to an area outside of a vehicle that the fuel system 20 is positioned within). According to various other embodiments, the water drain line 72 can direct the flow of water 84 from the return tube 60 to various areas that are within the front end or beginning of the fuel system 20, depending on the desired configuration. By returning the water 84 (or the fuel-liquid mixture) back to the front end of the fuel system 20, the last stages of the fuel system 20 are kept dry (from the water 84) and water 84 is prevented from entering into the HP pump 24 or the fuel injectors 26.

For example, according to one embodiment, the return tube 60 drains water 84 to the water drain line 72, which drains or directs the flow of water 84 to the front stages or end of the FWS 30, such as a stage 1, stage 2, or front stage FWS (or to the supply line leading to the FWS 30). According to another embodiment, the return tube 60 drains water 84 to the water drain line 72, which instead drains or directs the flow of water 84 directly to the fuel tank 40.

According to yet another embodiment, the return tube 60 drains water 84 to the water drain line 72, which instead drains or directs the flow of water 84 into the fuel return line 76, which then directs the flow to, for example, the fuel tank 40, the supply line 70, or the FWS 30. In this embodiment, since the pressure in the fuel return line 76 is strictly limited, the fuel system 20 further comprises an additional jet valve, or the fuel return line 76 has a relatively large cross-sectional flow area in order to prevent pressure build-up in the fuel return line 76. Alternatively, the return tube 60 may drain water 84 to the water drain line 72, which drains or directs the flow of water directly into the supply line 70.

After the water 84 (or the fuel-liquid mixture) is returned to the FWS 30 or the fuel tank 40, the water 84 is given another chance to settle and be separated and drained from the fuel again, which forms a circulating system that creates a multi-pass FWS function or loop to remove water 84 in the fuel system 20 (and within, for example, a vehicle).

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fuel filter assembly for filtering a fuel-liquid mixture, the fuel filter assembly comprising:
   a filter cartridge comprising:
      a filter media defining an open central region therein and configured to coalesce liquid within the central region, the central region being on a clean, filtered side of the filter media,
      a top endplate positioned along a top region of the filter media, and
      a housing containing the filter media; and
   a return tube extending through the top endplate of the filter media and into the central region up to a bottom inner region of the filter media such that a bottom end of the return tube is located within the bottom inner region, the return tube collecting and draining liquid from the bottom inner region and the central region of the filter media.

2. The fuel filter assembly of claim 1, wherein the return tube drains the liquid to an area outside of the fuel filter assembly.

3. The fuel filter assembly of claim 1, wherein the bottom end of the return tube is positioned within the bottom inner region of the filter media and is substantially open such that the liquid flows upward from the bottom inner region through the bottom end of the return tube and from the bottom end to a top end of the return tube.

4. The fuel filter assembly of claim 1, wherein the return tube automatically and continuously drains the liquid from the bottom inner region of the filter media.

5. A fuel system comprising:
   a fuel tank configured to store a fuel-liquid mixture;
   a fuel filter assembly for filtering the fuel-liquid mixture, the fuel filter assembly being fluidly connected to the fuel tank and comprising:
      a filter cartridge comprising:
         a filter media defining an open central region therein and configured to coalesce liquid within the central region, the central region being on a clean, filtered side of the filter media,
         a top endplate positioned along a top region of the filter media, and
         a housing containing the filter media, and
      a return tube extending through the top endplate of the filter media and into the central region up to a bottom inner region of the filter media such that a bottom end of the return tube is located within the bottom inner region, the return tube collecting and draining liquid from a bottom inner region and the central region of the filter media; and
   a liquid drain line coupled to the return tube.

6. The fuel system of claim 5, wherein the fuel filter assembly further comprises a filter head, wherein a top end of the return tube is sealed to the filter head.

7. The fuel system of claim 5, wherein the bottom end of the return tube is positioned within the bottom inner region of the filter media and is substantially open such that liquid flows upward from the bottom inner region through the bottom end of the return tube and from the bottom end to a top end of the return tube.

8. The fuel system of claim 5, wherein the return tube drains liquid from the bottom inner region of the filter media to an area outside of the fuel filter assembly.

9. The fuel system of claim 5, further comprising a supply line that fluidly connects the fuel tank to the fuel filter assembly and directs the fuel-liquid mixture from the fuel tank to the fuel filter assembly.

10. The fuel system of claim 5, wherein the return tube extends from a bottom region of the filter media to a top region of the filter media.

11. The fuel system of claim 5, wherein the return tube automatically and continuously drains liquid from the bottom inner region of the filter media.

12. The fuel system of claim 5, wherein the filter cartridge comprises a center tube that is positioned in the central region of the filter media, the return tube positioned within the central region of the center tube.

13. The fuel system of claim 5, wherein the return tube is positioned on the filtered side of the filter media.

14. A fuel system comprising:
a fuel tank configured to store a fuel-liquid mixture;
a fuel filter assembly for filtering the fuel-liquid mixture, the fuel filter assembly being fluidly connected to the fuel tank and comprising:
a filter cartridge comprising:
a filter media defining an open central region therein and configured to coalesce liquid within the central region, the central region being on a clean, filtered side of the filter media, and
a housing containing the filter media, and
a return tube extending into the central region up to a bottom inner region of the filter media such that a bottom end of the return tube is located within the bottom inner region, the return tube collecting and draining liquid from a bottom inner region and the central region of the filter media; and
a liquid drain line coupled to the return tube, wherein a top end of the return tube is sealed to the liquid drain line.

15. A fuel system comprising:
a fuel tank configured to store a fuel-liquid mixture;
a fuel filter assembly for filtering the fuel-liquid mixture, the fuel filter assembly being fluidly connected to the fuel tank and comprising:
a filter cartridge comprising:
a filter media defining an open central region therein and configured to coalesce liquid within the central region, the central region being on a clean, filtered side of the filter media, and
a housing containing the filter media, and
a return tube extending into the central region up to a bottom inner region of the filter media such that a bottom end of the return tube is located within the bottom inner region, the return tube collecting and draining liquid from a bottom inner region and the central region of the filter media;
a liquid drain line coupled to the return tube; and
a filter liquid separator, wherein the return tube drains liquid to the liquid drain line, which drains the liquid to a front end of the filter liquid separator.

16. A fuel system comprising:
a fuel tank configured to store a fuel-liquid mixture;
a fuel filter assembly for filtering the fuel-liquid mixture, the fuel filter assembly being fluidly connected to the fuel tank and comprising:
a filter cartridge comprising:
a filter media defining an open central region therein and configured to coalesce liquid within the central region, the central region being on a clean, filtered side of the filter media, and
a housing containing the filter media, and
a return tube extending into the central region up to a bottom inner region of the filter media such that a bottom end of the return tube is located within the bottom inner region, the return tube collecting and draining liquid from a bottom inner region and the central region of the filter media; and
a liquid drain line coupled to the return tube, wherein the return tube drains liquid to the liquid drain line, which drains liquid to the fuel tank.

17. A fuel system comprising:
a fuel tank configured to store a fuel-liquid mixture;
a fuel filter assembly for filtering the fuel-liquid mixture, the fuel filter assembly being fluidly connected to the fuel tank and comprising:
a filter cartridge comprising:
a filter media defining an open central region therein and configured to coalesce liquid within the central region, the central region being on a clean, filtered side of the filter media, and
a housing containing the filter media, and
a return tube extending into the central region up to a bottom inner region of the filter media such that a bottom end of the return tube is located within the bottom inner region, the return tube collecting and draining liquid from a bottom inner region and the central region of the filter media;
a liquid drain line coupled to the return tube;
a supply line that fluidly connects the fuel tank to the fuel filter assembly and directs the fuel-liquid mixture from the fuel tank to the fuel filter assembly; and
a fuel return line that returns fuel to the fuel tank, the supply line, or a filter liquid separator, wherein the return tube drains liquid to the liquid drain line, which drains liquid into the fuel return line.

18. A fuel system comprising:
a fuel tank configured to store a fuel-liquid mixture;
a fuel filter assembly for filtering the fuel-liquid mixture, the fuel filter assembly being fluidly connected to the fuel tank and comprising:
a filter cartridge comprising:
a filter media defining an open central region therein and configured to coalesce liquid within the central region, the central region being on a clean, filtered side of the filter media, and
a housing containing the filter media, and
a return tube extending into the central region up to a bottom inner region of the filter media such that a bottom end of the return tube is located within the bottom inner region, the return tube collecting and draining liquid from a bottom inner region and the central region of the filter media;
a liquid drain line coupled to the return tube; and
a supply line that fluidly connects the fuel tank to the fuel filter assembly and directs the fuel-liquid mixture from the fuel tank to the fuel filter assembly, wherein the return tube drains liquid to the liquid drain line, which drains liquid directly into the supply line.

19. A fuel system comprising:
a fuel tank configured to store a fuel-liquid mixture;
a fuel filter assembly for filtering the fuel-liquid mixture, the fuel filter assembly being fluidly connected to the fuel tank and comprising:
a filter cartridge comprising:

a filter media defining an open central region therein and configured to coalesce liquid within the central region, the central region being on a clean, filtered side of the filter media, and a housing containing the filter media, and a return tube extending into the central region up to a bottom inner region of the filter media such that a bottom end of the return tube is located within the bottom inner region, the return tube collecting and draining liquid from a bottom inner region and the central region of the filter media; and a liquid drain line coupled to the return tube, wherein the liquid within the filter cartridge is drained solely through the return tube, and the filter cartridge does not include any drain valve or liquid in fuel WIF sensor and does not need to be manually drained.

\* \* \* \* \*